(12) United States Patent
Jung et al.

(10) Patent No.: US 12,326,896 B2
(45) Date of Patent: Jun. 10, 2025

(54) METHOD FOR MANAGING LANGUAGE DATA AND SERVER USING THE SAME

(71) Applicant: AKA AI CO., LTD., Seoul (KR)

(72) Inventors: Myung Won Jung, Seoul (KR); Eun Hye Kwon, Busan (KR); Hoo Ram Nam, Busan (KR); Hye Seong Park, Sejong (KR)

(73) Assignee: AKA AI CO., LTD., Seoul (KR)

( * ) Notice: Subject to any disclaimer, the term of this patent is extended or adjusted under 35 U.S.C. 154(b) by 0 days.

(21) Appl. No.: 18/039,384

(22) PCT Filed: Aug. 23, 2022

(86) PCT No.: PCT/KR2022/012565
§ 371 (c)(1),
(2) Date: May 30, 2023

(87) PCT Pub. No.: WO2024/043355
PCT Pub. Date: Feb. 29, 2024

(65) Prior Publication Data
US 2024/0362263 A1    Oct. 31, 2024

(51) Int. Cl.
*G06F 16/355* (2025.01)
*G06F 16/31* (2019.01)

(52) U.S. Cl.
CPC .......... *G06F 16/355* (2019.01); *G06F 16/322* (2019.01)

(58) Field of Classification Search
CPC .............................. G06F 16/355; G06F 16/322
See application file for complete search history.

(56) References Cited

U.S. PATENT DOCUMENTS

| | | | |
|---|---|---|---|
| 11,294,974 B1* | 4/2022 | Shukla | G06F 16/90335 704/9 |
| 2006/0224584 A1* | 10/2006 | Price | G06F 16/313 707/E17.084 |
| 2018/0253496 A1* | 9/2018 | Natchu | G06F 16/951 704/9 |
| 2019/0079753 A1* | 3/2019 | Makkar | G06F 8/36 704/9 |
| 2019/0266288 A1* | 8/2019 | Shukla | G06F 16/9535 704/9 |
| 2020/0020325 A1* | 1/2020 | Nam | G06F 16/322 704/9 |
| 2021/0357378 A1* | 11/2021 | Urdiales | G06N 3/08 704/9 |
| 2022/0171945 A1* | 6/2022 | Jawale | G06F 40/35 704/9 |

(Continued)

*Primary Examiner* — Yuk Ting Choi
(74) *Attorney, Agent, or Firm* — The PL Law Group, PLLC

(57) ABSTRACT

In a state in which the language data in a tree structure includes at least one node and the at least one node includes at least one word, a plurality of word vectors including a first word vector and a second word vector is generated by a management server, based on the number of words included in each of a plurality of pieces of language data, and a dot product function of the first word vector and the second word vector is used by the management server to measure a score of similarity between first language data corresponding to the first word vector and second language data corresponding to the second word vector so that language data is managed for determining similarity by a management server.

6 Claims, 5 Drawing Sheets

(56) References Cited

U.S. PATENT DOCUMENTS

| | | | |
|---|---|---|---|
| 2023/0061341 A1* | 3/2023 | Shmueli | G06F 16/2237 704/9 |
| 2023/0103834 A1* | 4/2023 | Jeong | G06F 40/242 704/9 |
| 2023/0229680 A1* | 7/2023 | Verma | G06Q 10/20 704/9 |

* cited by examiner

FIG. 5

| tree | name | category | Level | #nodes | Depth |
|------|------|----------|-------|--------|-------|
| 3844 | Robot1 | Hobby | 1 | 255 | 8 |
| 3845 | Robot2 | Hobby | 3 | 255 | 8 |
| 3846 | doctor | Job | 2 | 255 | 8 |

•
•
•

METHOD FOR MANAGING LANGUAGE DATA AND SERVER USING THE SAME

CROSS REFERENCE TO RELATED APPLICATIONS AND CLAIM OF PRIORITY

This application claims benefit under 35 U.S.C. 119, 120, 121, or 365 (c), and is a National Stage entry from International Application No. PCT/KR2022/012565 filed on Aug. 23, 2022, the entire contents of which are incorporated herein by reference.

BACKGROUND

1. Technical Field

The present invention relates to a method for managing language data and a server using the same, and particularly relates to a method for managing language data for determining similarity, the method including, in a state in which the language data in a tree structure includes at least one node and the at least one node includes at least one word, generating, by a management server, a plurality of word vectors including a first word vector and a second word vector based on the number of words included in each of a plurality of pieces of language data, and using, by the management server, the dot product function of the first word vector and the second word vector to measure a score of similarity between first language data corresponding to the first word vector and second language data corresponding to the second word vector.

2. Background Art

Technologies have been developed in a variety of industry fields for self-driving cars, AI humanoids, robots as AI technologies develop. Such technologies have been utilized in the field of language particularly to provide various kinds of techniques and services such as recognition, translation, AI chatbots, and the like.

The field of language requires a wide range of subjects and diverse language data in order to improve the training abilities of artificial intelligence machines. In such a case, indiscriminate data are not beneficial to improvement in the training abilities, and thus a process of establishing a relationship between pieces of various language data is necessary.

In this background, the present inventor proposes a method for managing language data and a server using the same herein.

SUMMARY

Objectives of the present invention are as follows.

An objective of the present invention is to support an AI training process by classifying a plurality of pieces of language data by category or level and storing the data.

In addition, another objective of the present invention is to determine the level of similarity of each of a plurality of pieces of language data and classify the results in advance so that the data is utilized.

According to an aspect of the present invention, a method for managing language data for determining similarity includes, in a state in which the language data in a tree structure includes at least one node and the at least one node includes at least one word, a step of generating, by a management server, a plurality of word vectors including a first word vector and a second word vector based on the number of words included in each of a plurality of pieces of language data, and a step of using, by the management server, a dot product function of the first word vector and the second word vector to measure a score of similarity between first language data corresponding to the first word vector and second language data corresponding to the second word vector.

In addition, according to another aspect of the present invention, the management server may concatenate at least one word included in each of the plurality of pieces of language data, eliminate a stop word, and thus acquire a plurality of pieces of valid data, and generate the plurality of word vectors based on the number of keywords included in each piece of the plurality of valid data.

In addition, according to another aspect of the present invention, when a score of similarity between the first language data and the second language data is greater than a reference value, the management server may group the first word vector corresponding to the first language data and the second word vector corresponding to the second language data to generate and express one cluster on a graph.

In addition, according to another aspect of the present invention, in a state in which scores of similarity between the plurality of pieces of language data have been measured, the reference value may include a first reference value, a second reference value, and a third reference value, and the magnitudes of the first reference value, the second reference value, and the third reference value may sequentially increase, the management server may group word vectors of a pair of pieces of language data having a score of similarity higher than the first reference value together and then generate a plurality of first clusters on a graph, group word vectors of a pair of pieces of language data having a score of similarity higher than the second reference value together and then generate a plurality of second clusters on the graph, group word vectors of a pair of pieces of language data having a score of similarity higher than the third reference value together and then generate a plurality of third clusters on the graph, and acquire the second reference value satisfying a condition that the number of the plurality of second clusters is greater than the number of the plurality of first clusters or the number of the plurality of third clusters.

In addition, according to another aspect of the present invention, when the language data includes a plurality of nodes constituted by one sentence and the plurality of nodes include a first node, a 1-1 node corresponding to a left child node of the first node, and a 1-2 node corresponding to a right child node of the first node, a 1-1 sentence included in the 1-1 node and a 1-2 sentence included in the 1-2 node may correspond to a response to a first sentence included in the first node.

In addition, according to another aspect of the present invention, a level of the language data may be determined based on a word included in the first sentence, a word included in the 1-1 sentence, and a word included in the 1-2 sentence.

In addition, according to another aspect of the present invention, each of the plurality of pieces of language data in the tree structure may have the same depth.

In addition, according to another aspect of the present invention, a management server that manages language data for determining similarity includes a communication unit, a database, and a processor that, in a state in which the language data in a tree structure includes at least one node and the at least one node includes at least one word, generates a plurality of word vectors including a first word vector and a second word vector based on the number of words included in each of a plurality of pieces of language data, and uses a dot product function of the first word vector and the second word vector to measure a score of similarity between first language data corresponding to the first word vector and second language data corresponding to the second word vector.

According to the present invention described above, the following effects can be exhibited.

According to the present invention, the effect of supporting an AI training process by classifying a plurality of pieces of language data by category or level and storing the data can be exhibited.

In addition, according to the present invention, the effect of determining the level of similarity of each of a plurality of pieces of language data and classifying the results in advance so that the data is utilized can be exhibited.

BRIEF DESCRIPTION OF THE DRAWINGS

FIG. 5 is a table showing pieces of information of language data according to an embodiment of the present invention.

DETAILED DESCRIPTION

Figure 1:
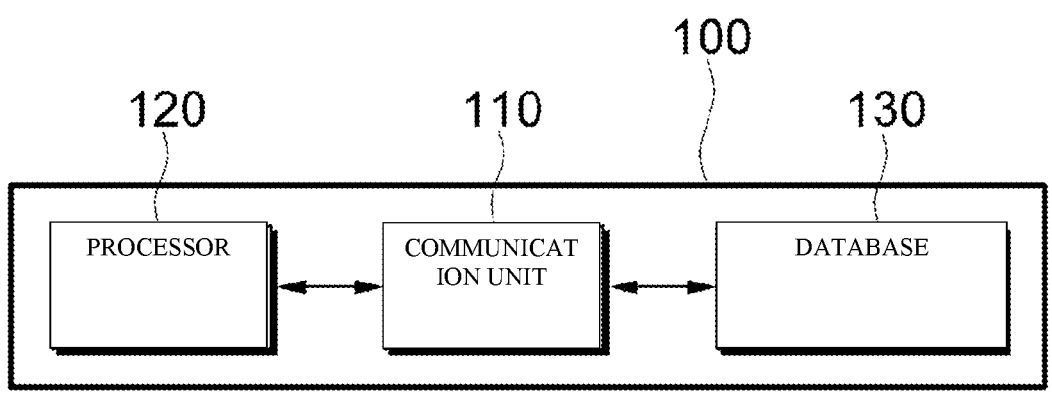
FIG. 1 is a diagram illustrating an overall configuration of a management server according to an embodiment of the present invention.

Detailed description of the present invention to be described below refers to appended diagrams which illustrate specific embodiments in which the present invention may be implemented as examples. Such embodiments are described in detail sufficiently for a person skilled in the art to implement the present invention. It should be understood that various embodiments of the present invention differ from each other, but need not be mutually exclusive. For example, specific forms, structures, and features described herein relating to an embodiment can be implemented in another embodiment without departing from the spirit and scope of the present invention. In addition, it should be understood that the position or arrangement of individual components included in each disclosed embodiment can be changed without departing from the spirit and scope of the present invention. Therefore, the detailed description provided below is not intended to be limited, and the scope of the present invention is limited only by the claims together with all equivalents to what the claims assert, if properly stated. Similar reference signs in the drawings denote the same or similar functions in various aspects.

In order to enable a person with common knowledge of the technical to which the present invention belongs to easily implement the present invention, exemplary embodiments of the present invention will be described below in detail with reference to the appended drawings.

FIG. 1 is a diagram illustrating an overall configuration of a management server according to an embodiment of the present invention.

A management server (100) of the present invention includes a communication unit (110) and a processor (120) as illustrated in FIG. 1, and may not include a database (130) in some cases, unlike in FIG. 1.

The communication unit (110) of the management server (200) can be realized by using any of various communication technologies. That is, Wi-Fi, wideband CDMA (WCDMA), High-Speed Downlink Packet Access (HSDPA), High-Speed Uplink Packet Access (HSUPA), High-Speed Packet Access (HSPA), mobile WiMAX, Wi-Bro, Long Term Evolution, 5G, 6G, Bluetooth, Infrared Data Association (IrDA), Near Field Communication (NFC), Zigbee, a wireless LAN technology, and the like can be applied thereto. In addition, the communication unit may comply with TCP/IP that is a standard protocol for transmitting information on the Internet when a service is to be provided in connection to the Internet.

Next, the database (13) of the invention of the present specification can store information of a plurality of pieces of language data (e.g., tree numbers, the number of nodes, node depths, etc.). When an external database is used, the management server (100) is able to access the external database through the communication unit (110).

In addition, the processor (120) can include hardware configurations such as a micro-processing unit (MPU) or a central processing unit (CPU), a cache memory, and a data bus. Furthermore, the management server (200) can further include software configurations such as an operating system and an application that accomplishes a specific goal.

In addition, an administrator can transmit and receive information to and from the management server (100) through a terminal (not illustrated), and with respect to the terminal, a desktop computer, a notebook computer, a work station, a PDA, a web pad, a mobile telephone, a smart remote controller, any of various IoT main devices may correspond to a terminal according to the present invention as long as it can perform communication, is equipped with a memory section, and has a micro-processor mounted therein to be able to perform arithmetic operations.

First, language data will be described with reference to FIG. 2.

Figure 2:
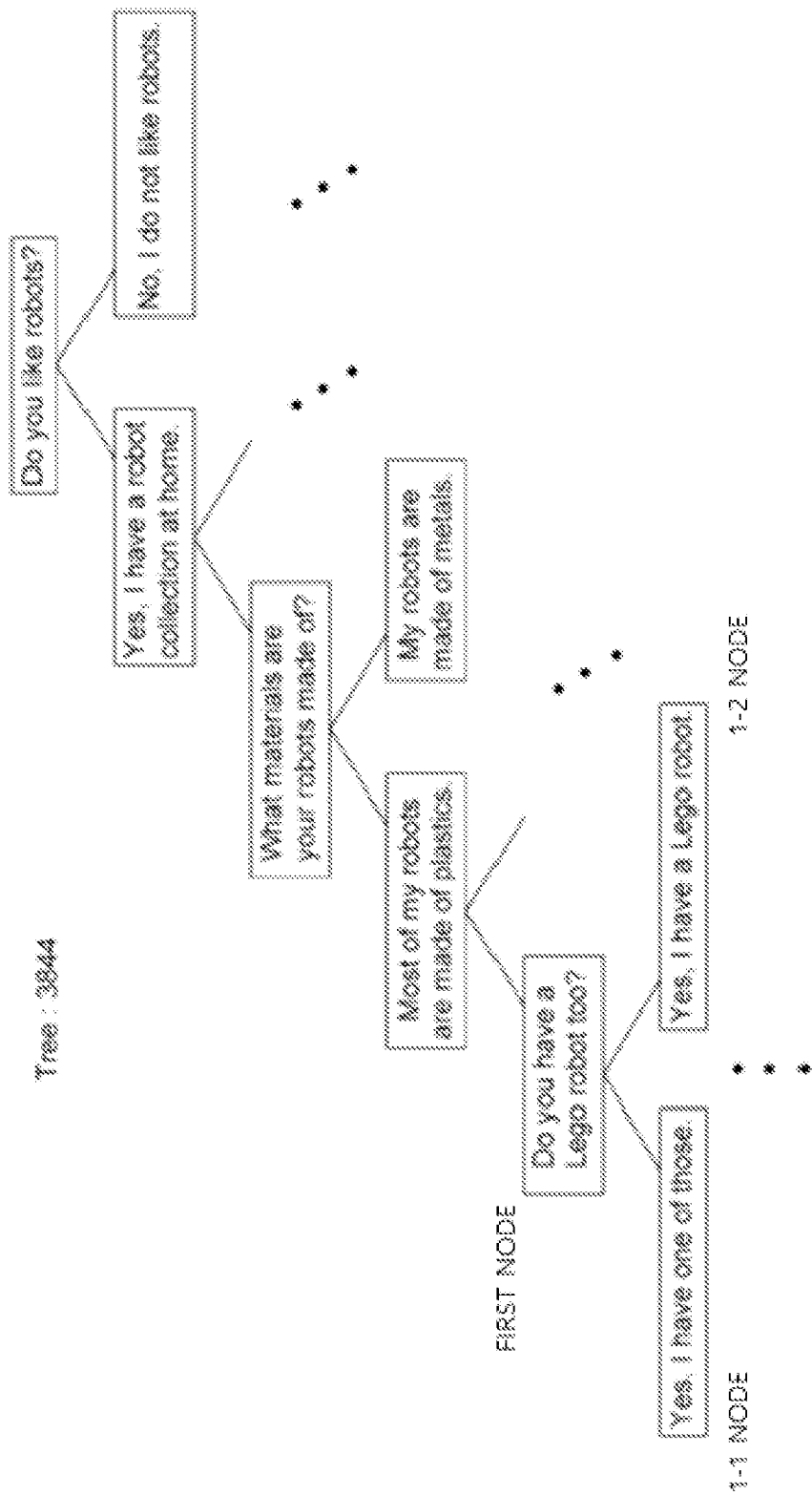
FIG. 2 is a diagram illustrating language data in a tree structure according to an embodiment of the present invention.

FIG. 2 is a diagram illustrating language data in a tree structure according to an embodiment of the present invention.

Language data that the present invention deals with may have a tree structure and include at least one node. Here, the at least one node may include one sentence.

One piece of language data has a tree structure, and may include a plurality of nodes and sentences such as a root node ("Do you like robots?"), child nodes ("Yes, I have a robot collection at home," and "No, I do not like robots"), grandchild nodes ("What materials are your robots made of?," and the like), lower nodes, and leaf nodes ("Yes, I have one of those," "Yes, I have a Lego robot," and the like) as illustrated in FIG. 2.

Although the language data of the present invention has a binary tree structure as illustrated in FIG. 2, the language data (in the tree structure) may have one node with three or more child nodes, or may have only one child node in some cases. In other words, the language data of the present invention may have any of various tree structure including one root node.

In addition, the trees of the plurality of pieces of language data may all have the same depth (level). For example, the trees may have a depth (level) 8 as saturated binary trees, and thus all of the language data (trees) may include 255 nodes and 255 sentences. Of course, the trees of the plurality of pieces of language data may have different depths and different numbers of nodes (sentences) in some cases.

For convenience of description, it is assumed that a plurality of nodes included in any one piece of language data include a first node, a 1-1 node corresponding to the left child node of the first node, and a 1-2 node corresponding to the right child node of the first node.

In this case, a 1-1 sentence included in the 1-1 node and a 1-2 sentence included in the 1-2 node may be responses to a first sentence included in the first node. As can be seen from FIG. 2, responses to "Do you have a Lego robot, too?" included in the first node may be "Yes, I have one of those" of the 1-1 node and "Yes, I have a Lego robot" of the 1-2 node.

Because the responses to the sentence included in the parent node are included in the child nodes, all sentences (corresponding to nodes) included in one piece of language data (in one tree structure) may be related to each other (in terms of the same subject and same category).

For reference, the sentences (nodes) included in the plurality of pieces of language data are acquired from a terminal (input) of an operator, and the tree structure may be determined by the operator as well based on the input from the terminal. The plurality of pieces of language data generated through the above-described process can be stored in the database (130).

A process performed by the processor (120) of the management server (100) of the present invention will be discussed below with reference to FIG. 3.

Figure 3:
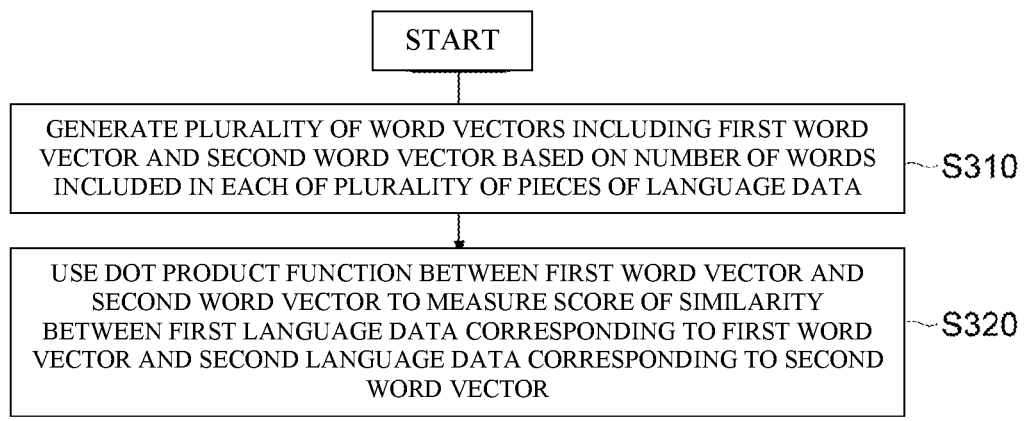
FIG. 3 is a diagram illustrating a process of measuring a score of similarity between a plurality of pieces of language data according to an embodiment of the present invention.

FIG. 3 is a diagram illustrating a process of measuring a score of similarity between a plurality of pieces of language data according to an embodiment of the present invention.

The processor (120) of the management server (100) can generate a plurality of word vectors based on the number of words included in each of the plurality of pieces of language data (S310). At this time, the plurality of word vectors may include a first word vector and a second word vector.

Specifically, the processor (120) of the management server (100) concatenates at least one word included in each of the plurality of pieces of language data, eliminate stop words, and thereby can acquire a plurality of pieces of valid data. Since language data includes a plurality of nodes (sentences) as described above, the processor (120) can eliminate the stop words included in the sentences by concatenating the plurality of sentences into one.

The processor (120) can eliminate not only the stop words but also punctuations and typos.

One piece of valid data (data created by concatenating one word or sentence excluding stop words) can be acquired from a certain piece of language data, and the processor (120) can generate a plurality of word vectors based on the number of keywords included in each of a plurality of pieces of acquired valid data.

Here, a variety of keywords such as 'rain,' 'weather,' and 'music' may be the examples, and they may be set in advance. In some cases, such keywords may not be set in advance and may be determined based on the words included in each piece of the valid data (e.g., a predetermined number of words may be set as keywords, the words being selected from those having been appeared in the plurality of pieces of valid data a larger number of times in descending order). Keywords may vary in each category to be described below.

If the keywords are 'rain,' 'weather,' 'robot,' and 'music,' for example, the processor (120) may count how many times each of the keywords is included in the plurality of pieces of language data (valid data), and then generate multi-dimensional (e.g., four-dimensional) word vectors based on the results.

Although only the keywords 'rain,' 'weather,' 'robot,' and 'music' are considered in the above description, practically more than 300 keywords can be considered, and thus the word vectors in that case may also be about 300-dimensional. In addition, the keywords may be set in advance, but may vary depending on words included in the plurality of pieces of language data.

Word vectors according to an embodiment of the present invention are as follows.

First, the total number of words included in specific language data (specific tree), the frequency of appearance of a keyword in the specific language data, the number of the plurality of pieces of language data (trees), and the number of pieces of language data (trees) including the keyword can be calculated.

Next, a term frequency (TF: calculated with the formula "the frequency of appearance of a keyword in the specific language data/the total number of words included in the specific language data"), and an inverse document frequency (IDF, calculated with the formula "Log (the number of the plurality of pieces of language data (trees)/the number of pieces of language data (trees) including the keyword)") may be calculated.

In addition, the processor may acquire a calculated value for each keyword as the result of TF (the frequency of appearance of a keyword in the specific language data/the total number of words included in the specific language data)×IDF (Log (the number of the plurality of pieces of language data/the number of pieces of language data including the keyword)), and as a result, the processor can generate a plurality of multi-dimensional word vectors (0.52, 0.48, 0.28, . . . ).

In other words, the plurality of word vectors can be generated by using so-called Terms Frequency-Inverse Document Frequency (TF-IDF) in the present invention.

Next, the processor (120) of the management server (100) can use the dot product function between the first word vector and the second word vector to measure a score of similarity between first language data corresponding to the first word vector and second language data corresponding to the second word vector (S320).

Here, the dot product function is a kind of cosine function from which a score of similarity between the multi-dimensional (e.g., 300-dimensional) first word vector and second word vector can be measured. The score of similarity may be the result of the dot product function greater than zero and smaller than 1.

For example, when there is only the keyword 'rain' and the keyword 'rain' appears 10 times in the first language data, 20 times in the second language data, and one time in third language data, the score of similarity between the first word vector (corresponding to the first language data) and the second word vector (corresponding to the second language data) may be higher than the score of similarity between the first word vector and the third word vector (corresponding to the third language data).

In other words, there will be a high probability that, as the two pieces of language data have a higher score of similarity, they are more highly correlated, include the same words, and share the same subject and belong to the same category.

When the score (e.g., 0.8) of similarity between the first language data and the second language data is higher than a reference score (e.g., 0.6) according to an embodiment of the present disclosure, the processor (120) of the management server (100) groups the first word vector corresponding to the first language data and the second word vector corresponding to the second language data, and then creates one cluster on a graph (a graph on which multi-dimensional word vectors can be plotted) to represent the word vectors.

Here, the word vectors mean the point of each type of language data marked on the multi-dimensional graph, and the cluster mean the group in which the word vectors are concatenated. In other words, each cluster means one subject (category), and there will be a high probability that the word vectors (language data) included in one cluster share the same subject.

According to an embodiment of the present invention, it can be set that one of the word vectors is not allowed to constitute the cluster and two or more concatenated word vectors can constitute one cluster.

Although only the first word vector, the second word vector, and the third word vector have been mentioned for convenience of description, scores of similarity between a plurality of word vectors can be measured.

A process in which a score of similarity between a pair of word vectors (e.g., the first word vector and the second word vector) among a plurality of word vectors is measured and expressed will be described below with reference to FIG. 4.

Figure 4:
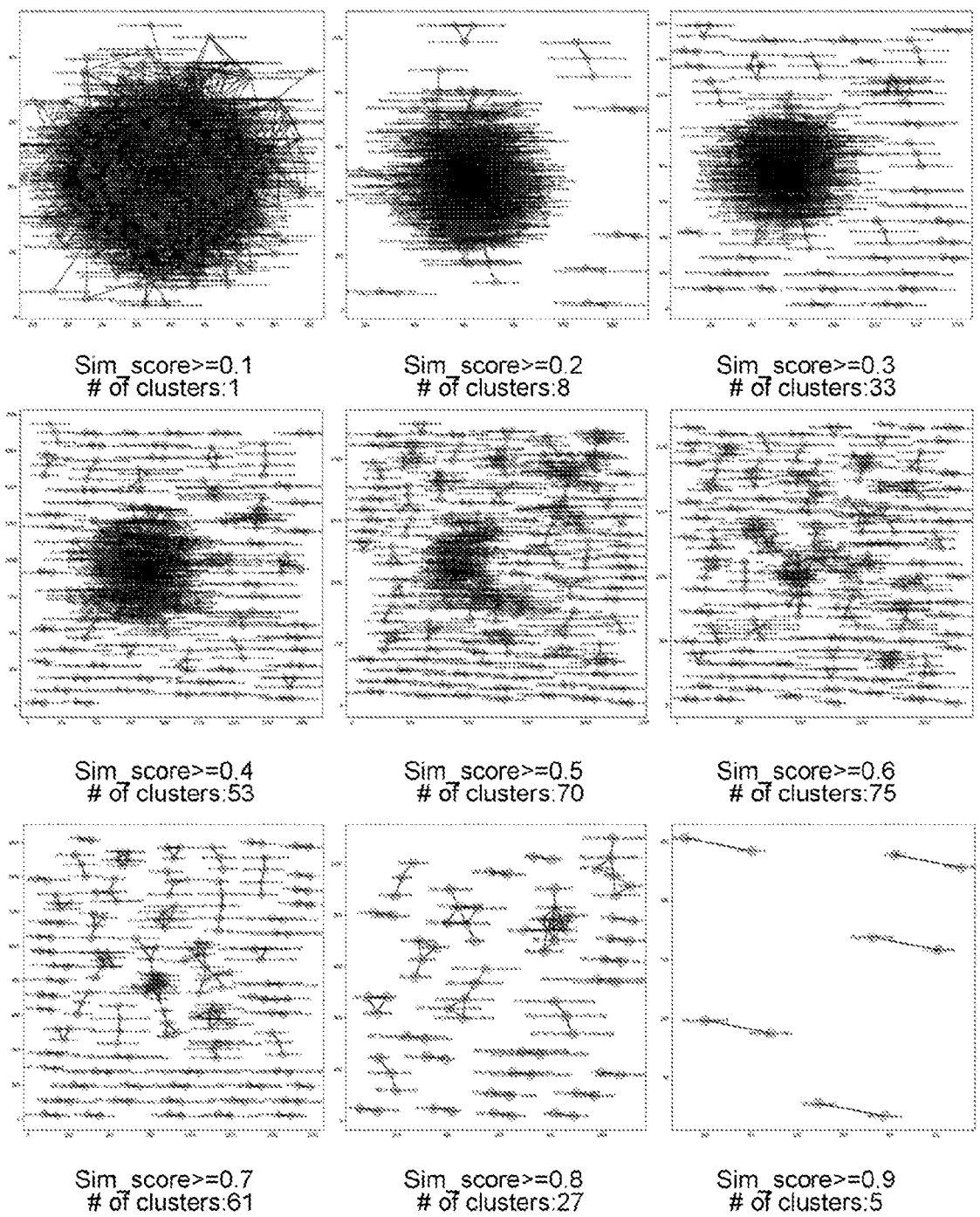
FIG. 4 are graphs showing the number of clusters generated based on the magnitudes of reference values according to an embodiment of the present invention.

FIG. 4 are graphs showing the number of clusters created based on the magnitudes of reference values according to an embodiment of the present invention. For reference, the graphs are merely represented in two dimensions, but may actually correspond to graphs representing multi-dimensions (e.g., 300-dimensions).

It may be assumed that scores of similarity between a plurality of pieces of language data have been measured, the reference values include at least a first reference value, a second reference value, and a third reference value, and the magnitudes of the first reference value, the second reference value, and the third reference value sequentially increase. In other words, "first reference value<second reference value<third reference value" is assumed.

At this time, the processor (120) of the management server (100) groups the word vectors of a pair of pieces of language data having a score of similarity higher than the first reference value together and then generates a plurality of first clusters on a graph.

In addition, the processor (120) groups the word vectors of a pair of pieces of language data having a score of similarity higher than the second reference value together and then generates a plurality of second clusters on the graph, and groups the word vectors of a pair of pieces of language data having a score of similarity higher than the third reference value together and then generates a plurality of third clusters on the graph.

In this state, the processor (120) can acquire the second reference value satisfying a condition that the number of the plurality of second clusters is greater than the number of the plurality of first clusters or the number of the plurality of third clusters.

Referring to FIG. 4, the number of clusters is one when the reference value is 0.1, the number of clusters is eight when the reference value is 0.2, the number of clusters is 33 when the reference value is 0.3, the number of clusters is 53 when the reference value is 0.4, the number of clusters is 70 when the reference value is 0.5, the number of clusters is 75 when the reference value is 0.6, the number of clusters is 61 when the reference value is 0.7, the number of clusters is 27 when the reference value is 0.8, and the number of clusters is five when the reference value is 0.9.

Referring to FIG. 4, there is one large-sized cluster when the reference value is 0.1, but when the reference value is 0.2, the word vectors can be divided into eight small-sized clusters. This means that the number of clusters increases as the reference value becomes higher. However, pairs of pieces of language data (word vectors) having a low score of similarity are no longer concatenated when the reference value becomes higher than 0.6, and thus the number of clusters may become smaller, which is reflected FIG. 4.

In more detail, it can be seen that the number of clusters is 70 when the reference value is 0.5, the number of clusters is 75 when the reference value is 0.6, and the number of clusters is 61 when the reference value is 0.7.

Since the number of clusters is greater when the reference value is 0.6 than when the reference value is 0.5 or 0.7, the processor (120) may acquire 0.6 as the second reference value. In other words, the processor (120) may acquire the largest number of clusters (categories or subjects) when the reference value is 0.6 according to an embodiment of the present invention.

When the pieces of a pair of language data having a score of similarity higher than the reference value are concatenated with each other to form a cluster, there are a plurality of pairs of language data having scores of similarity higher than a low reference value (e.g., 0.1), the pieces of the language data may be concatenated with each other (due to the low reference value), and thus a small number of clusters (e.g., one) may be generated. The clusters at this time may include a large number of word vectors (language data).

On the other hand, there may be a small number of pairs of language data having scores of similarity higher than a high reference value (e.g., 0.9), and thus fewer (e.g., five) clusters may be similarities generated. The clusters at this time may include fewer word vectors (language data).

As a result, the number of clusters may increase and then decrease as the reference value becomes higher. Considering FIG. 4, the largest number of clusters is 75, and the reference value at that time is 0.6. Depending on various situations of the types and the number of pieces of language data, the number of clusters for each reference value and the acquired reference value (0.6 in the case of FIG. 4) may be different from those of FIG. 4.

The processor (120) of the present invention may determine whether pieces of language data are concatenated by adjusting the reference values described above, and thereby may determine the number, the shape, and the like of clusters accordingly. Word vectors (language data) included in one cluster may be determined to be similar (to have the same category or subject).

FIG. 5 is a table showing pieces of information of language data according to an embodiment of the present invention.

As described above, language data of the present invention may have a tree structure in which a plurality of nodes (sentences) are included. For convenience of description, it can be assumed that the plurality of nodes includes a first node (a first sentence), a 1-1 node (a 1-1 sentence), a 1-2 node (a 1-2 sentence), and the like, as in FIG. 2 (Tree 3844).

In this case, the processor (120) may determine a level of the language data based on words included in the first sentence, words included in the 1-1 sentence, and words included in the 1-2 sentence.

Specifically, a plurality of words may be grouped by level of difficulty, and the language data may have a higher level when the data includes more words with a higher level of difficulty. Although the words are classified into level 1 to level 3 in FIG. 5, methods for determining levels may vary.

Levels of difficulty of such words may be determined with reference to school curricula (e.g., words for higher graders, words for lower graders, etc.).

In addition, categories (e.g., hobby, job, etc.) may be determined depending on the types of words included in the language data. Specifically, first, a plurality of categories may be set in advance, and each corresponding category may include a plurality of words.

For example, "hobby" category may include various words such as 'robot,' 'bike,' 'car,' and 'picture,' and 'job' category may include various words such as 'doctor,' 'singer,' and 'lawyer.' Such words may be repeatedly included in a plurality of categories.

The processor (120) of the management server (100) may analyze the words included in the language data, ascertain what category of words are included mostly, and then determine the category of the corresponding language data based on the result.

The same word (e.g., robot) may be included in the language data multiple (e.g., five) times, and the processor (120) may count the multiple (e.g., five) same words multiple times (e.g., five) to determine the category. The reason for this is that there is no need to reduce the frequency of a word used repeatedly.

In addition, information of the number unique to each of the plurality of pieces of language data (e.g., tree 3844 of FIG. 2), the number of nodes (e.g., 255), and the depth of the tree (e.g., eight) as shown in FIG. 5 can be recorded in the database (130).

As described above, the processor (120) of the management server (100) according to the present invention may group the plurality of pieces of language data in a tree structure based on whether the pieces are similar with reference to a reference value. In addition, the processor (120) may group a plurality of pieces of language data by level based on the level of each piece of the language data stored in advance.

In that state, the processor (120) may utilize the plurality of pieces of language data in English training programs according to an embodiment of the present invention.

The processor (120) may allow a trainee to select one piece of first specific language data (first specific tree) among the plurality of pieces of language data for training.

The processor (120) may generate at least one of various stories each composed of sentences from a sentence corresponding to the root node of the first specific language data (first specific tree) to a sentence corresponding to a leaf node of the first specific language data (first specific tree) at random (since there are a plurality of paths from the root node to the leaf node), and such a story can be considered as an example of a first training program.

After the first training program about the first training program (from the root node to the leaf node) ends, the processor (120) may provide the trainee with various stories (since there are a plurality of paths from the root node to the leaf node) using other language data having a high level of similarity to the first specific language data as a second training program. At this time, the word vector corresponding to the first specific language data and the word vector corresponding to the other language data may be included in the same cluster.

The processor (120) may acquire language data having a high level of similarity or a certain level of similarity to the first specific language data by adjusting the reference value, and may provide the acquired language data (training program) to the terminal of the trainee next to the first specific language data depending on the purpose of training.

In addition, the processor (120) of the present invention may utilize the plurality of pieces of language data as a pre-processing process for training AI language models.

Specifically, the processor (120) may cause an operator to select second specific language data to proceed with training of an AI language model. Since an enormous amount of refined data is needed to proceed with training of an AI language model, the processor (120) of the management server (100) may provide the terminal of the operator with other language data having a high level of similarity with the second specific language data.

At this time, the processor (120) may control the number of pieces of language data having a high level of similarity to the second specific language data by adjusting the reference value. The reason for this is that the total number of pieces of language data included in the cluster in which the second specific language data is included may vary depending on the reference value.

Thus, when the operator selects the second specific language data including contents of a movie, the processor (120) may provide the terminal of the operator with other language data including the contents of the movie to support training.

The embodiments according to the present invention described above may be implemented in the form of program commands that can be executed by various computer components and recorded in a computer-readable recording medium. The computer-readable recording medium includes program commands, data files, data structures, and the like alone or in combination. The program commands recorded on the computer-readable recording medium may be specially designed and configured for the present invention, or may be known to and usable by those skilled in the art of computer software. Examples of computer-readable recording medium include hardware devices specially configured to store and execute program commands, such as hard disks, ROMs, RAMs, flash memories, and the like. Examples of program commands include high-level language codes that can be executed by a computer using an interpreter or the like as well as machine language codes generated by a compiler. The hardware devices may be configured to work as one or more software modules in order to execute processing according to the present invention, and vice versa.

Although the present invention has been described above by using specific factors such as specific constituent elements, limited embodiments, and drawings, they are provided only to help general understanding of the invention. The present invention is not limited by the embodiments, and those with common knowledge in the technical field to which the present invention belongs can seek various modifications and alterations in these descriptions.

Therefore, the idea of the present invention should not be limited to and defined by the above-described embodiments, and not only the scope of claims to be described later but also all equivalents or equivalent modifications to the scope of this patent claim fall within the scope of the idea of the present invention.

What is claimed is:

1. A method for managing language data for determining similarity, the method comprising:
   in a state in which the language data in a tree structure includes at least one node, and the at least one node includes at least one word,
   (a) generating, by a management server, a plurality of word vectors including a first word vector and a second word vector based on the number of words included in each of a plurality of pieces of language data;

(b) using, by the management server, a dot product function of the plurality of word vectors including the first word vector and the second word vector to measure a score of similarity among a plurality of pieces of language data including first language data corresponding to the first word vector and second language data corresponding to the second word vector;

wherein, in a state in which scores of similarity between the plurality of pieces of language data have been measured, a reference value includes a first reference value, a second reference value, and a third reference value, and the magnitudes of the first reference value, the second reference value, and the third reference value sequentially increase, and the method further comprises:

(c) grouping, by the management server, word vectors of a pair of pieces of language data having a score of similarity higher than a first reference value together and then generating a plurality of first clusters on a graph;

(d) grouping, by the management server, word vectors of a pair of pieces of language data having a score of similarity higher than a second reference value together and then generating a plurality of second clusters on the graph;

(e) grouping, by the management server, word vectors of a pair of pieces of language data having a score of similarity higher than a third reference value together and then generating a plurality of third clusters on the graph; and (f) acquiring the second reference value satisfying a condition that the number of the plurality of second clusters is greater than the number of the plurality of first clusters or the number of the plurality of third clusters.

2. The method for managing language data according to claim 1, wherein the management server concatenates at least one word included in each of the plurality of pieces of language data, eliminates a stop word, and thus acquires a plurality of pieces of valid data, and generates the plurality of word vectors based on the number of keywords included in each piece of the plurality of valid data.

3. The method for managing language data according to claim 1, wherein, when the language data includes a plurality of nodes constituted by one sentence and the plurality of nodes include a first node, a 1-1 node corresponding to a left child node of the first node, and a 1-2 node corresponding to a right child node of the first node, a 1-1 sentence included in the 1-1 node and a 1-2 sentence included in the 1-2 node corresponds to a response to a first sentence included in the first node.

4. The method for managing language data according to claim 3, wherein a level of the language data is determined based on a word included in the first sentence, a word included in the 1-1 sentence, and a word included in the 1-2 sentence.

5. The method for managing language data according to claim 1,
wherein each of the plurality of pieces of language data in the tree structure has the same depth.

6. A management server configured to manage language data for determining similarity, the management server comprising:
a communication unit;
a database; and
a processor configured to, in a state in which the language data in a tree structure includes at least one node and the at least one node includes at least one word;
generate a plurality of word vectors including a first word vector and a second word vector based on the number of words included in each of a plurality of pieces of language data;
use a dot product function of the plurality of word vectors including the first word vector and the second word vector to measure a score of similarity among a plurality of pieces of language data including first language data corresponding to the first word vector and second language data corresponding to the second word vector, wherein, in a state in which scores of similarity between the plurality of pieces of language data have been measured, the reference value includes a first reference value, a second reference value, and a third reference value, and the magnitudes of the first reference value, the second reference value, and the third reference value sequentially increase, the management server is configured to:
group word vectors of a pair of pieces of language data having a score of similarity higher than a first reference value together and then generates a plurality of first clusters on a graph;
group word vectors of a pair of pieces of language data having a score of similarity higher than a second reference value together and then generate a plurality of second clusters on the graph;
group word vectors of a pair of pieces of language data having a score of similarity higher than a third reference value together and then generate a plurality of third clusters on the graph; and
acquire the second reference value satisfying a condition that the number of the plurality of second clusters is greater than the number of the plurality of first clusters or the number of the plurality of third clusters.

* * * * *